(12) United States Patent
Lim et al.

(10) Patent No.: US 8,611,734 B2
(45) Date of Patent: Dec. 17, 2013

(54) IMAGE PHOTOGRAPHING DEVICE HAVING FUNCTION FOR COMPENSATING HAND VIBRATION

(75) Inventors: Soo Cheol Lim, Suwon-si (KR); Jung Seok Lee, Suwon-si (KR); Byung Woo Kang, Seoul (KR); Sang Min On, Seoul (KR); Young Bok Yoon, Yongin-si (KR); Seong Ho Kang, Seongnam-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 73 days.

(21) Appl. No.: 13/137,722

(22) Filed: Sep. 7, 2011

(65) Prior Publication Data

US 2012/0106936 A1   May 3, 2012

(30) Foreign Application Priority Data

Nov. 3, 2010   (KR) .................. 10-2010-0108806

(51) Int. Cl.
| | |
|---|---|
| G03B 17/00 | (2006.01) |
| G03B 3/10 | (2006.01) |
| G03B 13/34 | (2006.01) |
| H04N 5/228 | (2006.01) |
| G02B 27/64 | (2006.01) |
| G02B 7/02 | (2006.01) |

(52) U.S. Cl.
USPC ........ 396/55; 396/133; 396/529; 348/208.11; 359/557; 359/824

(58) Field of Classification Search
USPC ............. 396/55, 52, 133, 529; 348/207.99, 348/208.99, 208.4, 208.7, 208.11, 340; 359/554, 557, 819, 822–824
See application file for complete search history.

(56) References Cited

U.S. PATENT DOCUMENTS

2008/0144200 A1* 6/2008 Kim et al. ............... 359/824

FOREIGN PATENT DOCUMENTS

| JP | 2000-132852 | 5/2000 |
|---|---|---|
| KR | 10-2009-0046307 | 5/2009 |
| KR | 10-2010-0022903 | 3/2010 |
| KR | 10-2010-0066678 | 6/2010 |

OTHER PUBLICATIONS

Korean Office Action dated Nov. 30, 2011 issued in corresponding Korean Patent Application No. 10-2010-0108806.

* cited by examiner

*Primary Examiner* — Rochelle-Ann J Blackman (57) ABSTRACT

Disclosed herein is an image photographing device having a function for compensating hand vibration. The image photographing device having a function for compensating hand vibration includes: an optical unit; a magnet combined with an outer peripheral surface of the optical unit; a housing inserted with the optical unit and the magnet and having coils disposed at a position corresponding to the magnet; suspension wires arranged at four corners of the optical unit, having the upper end portions and the lower end portions each combined with the optical unit and the housing to support the optical unit in a state floated from the bottom surface of the housing, and having a predetermined bending part formed at any point; a flexible printed circuit board surrounding the outer peripheral surface of the housing and applying current to the coils; and a substrate having the image sensor mounted on the top surface thereof and combined with the lower portion of the housing.

23 Claims, 5 Drawing Sheets

IMAGE PHOTOGRAPHING DEVICE HAVING FUNCTION FOR COMPENSATING HAND VIBRATION

CROSS REFERENCE(S) TO RELATED APPLICATIONS

This application claims the benefit under 35 U.S.C. Section 119 of Korean Patent Application Serial No. 10-2010-0108806, entitled "Image Photographing Device Having Function For Compensating Hand Vibration" filed on Nov. 3, 2010, which is hereby incorporated by reference in its entirety into this application.

BACKGROUND OF THE INVENTION

1. Technical Field

The present invention relates to an image photographing device having a function for compensating hand vibration, and more particularly, to an image photographing device having a function for compensating hand vibration capable of minimizing deformations of a suspension wire caused due to an external impact by changing a shape of the suspension wire and a supporting structure supporting an optical unit.

2. Description of the Related Art

Recently, the use of a subminiature camera module for a mobile device has been increasingly expanded for mobile devices such as mobile phones, notebooks, tablet PCs, or the like. The subminiature camera used for the mobile devices has also required high pixels of five million pixels or more and a high function such as a zoom function, an auto focus (AF), or the like, according to customer demands.

Generally, the camera module used for the mobile devices may be configured to include an optical system including a lens, a lens driver moving the optical system to an optical axis direction to control a focus, and an image sensor photographing light input through the optical system to convert it into image signals.

As the camera module configured as described above is implemented as high pixels and high functions, the size of a pixel is small and the number of components through which light passes are increased, such that the light receiving sensitivity photographed by the image sensor may be sensitive and the focus of an image photographed by the image sensor become deviated even in slight hand vibrations at the instant when the shutter of the camera or the mobile device is operated, thereby deteriorating the image quality and obtaining blur photographs.

In order to prevent the deterioration in image quality due to hand vibration, as light passing through the lens of the optical system is generated by being deviated from the optical axis of the lens, the optical axis of the lens coincides with an incident path of light by moving the lens in a direction vertical to the optical axis or the optical axis coincides with the incident path of light received in the optical axis and the image sensor by moving the image sensor in a direction vertical to the optical axis, thereby compensating for the hand vibration.

That is, a relative displacement is assigned to the lens or the image sensor in a direction vertical to each optical axis, thereby compensating the hand vibration.

As described above, the method for compensating hand vibration by assigning the relative displacement to the lens or the image sensor generally installs a biaxial guide supporting the lens in a T-letter shape or an L-letter shape to move the lens in a relative direction of the driving displacement caused by the hand vibration while driving the lens in a direction vertical to the optical axis along the biaxial guide, thereby compensating the hand vibration.

In this case, when the lens moves along the biaxial guide, there are problems in that the compensation performance may be degraded due to the friction between the biaxial guide and the lens and noise or foreign materials may occur due to the friction with other component members at the time of driving the biaxial guide and the lens or the biaxial guide.

Further, since the biaxial guide supports the periphery of the lens, there is an advantage in that the size of the camera module may be increased by a space in which the biaxial guide is installed.

Meanwhile, in order to reduce the noise or the foreign materials, a method of driving the lens in a direction vertical to the optical axis in a floated state while the optical unit is supported by the suspension wire is provided. The optical unit moves in the relative direction of the driving displacement generated by the hand vibration due to the electromagnetic force in the state in which the optical unit is supported to the suspension wire, thereby compensating for the hand vibration.

The device for compensating the hand vibration according to the above-mentioned method does not cause the operation noise by not causing the friction between the optical unit and other components and can minimize the degradation in performance by not causing the foreign materials due to the friction.

However, when the external impact such as dropping is applied to the mobile device, the compression stress is applied to the suspension wired supporting the optical unit and when the compression stress is out of the unique breakdown stress of the wire, the wire is subjected to deformations, such as bending, rupturing, etc.

That is, when one or more shaft of the suspension wire supporting the optical unit is deformed, there are problem in that the function for compensating hand vibration is degraded or when the wire is ruptured, the optical unit may be inclined.

In order to prevent these problems, the breakdown stress may be increased by making the diameter of the suspension wire large. However, when the diameter of the suspension wire is large, the spring rigidity is increased in a direction orthogonal to the optical axis to degrade the driving performance for compensating the hand vibration, and the size of the driving member may be increased and the overall size of the photographing device having the function for compensating the hand vibration may be increased accordingly.

SUMMARY OF THE INVENTION

An object of the present invention is to provide an image photographing device having a function for compensating hand vibration capable of preventing deformations of a suspension wire due to external impact by forming a curved portion at any point of the suspension wire supporting an optical unit or combining the suspension wire with an optical unit by a plate spring.

According to an exemplary embodiment of the present invention, there is provided an image photographing device having a function for compensating hand vibration, including: an optical unit; a magnet combined with an outer peripheral surface of the optical unit; a housing inserted with the optical unit and the magnet and having coils disposed at a position corresponding to the magnet; suspension wires arranged at four corners of the optical unit, having the upper end portions and the lower end portions each combined with the optical unit and the housing to support the optical unit in a state floated from the bottom surface of the housing, and having a predetermined bending part formed at any point; a flexible printed circuit board surrounding the outer peripheral surface of the housing and applying current to the coils; and a substrate having the image sensor mounted the top surface thereof and combined with the lower portion of the housing.

The optical unit includes a lens barrel mounted with a lens group and the lens barrel is mounted in the bobbin to vertically drive the lens barrel within the bobbin by the driver. The driver may be implemented by using a scheme using a piezo, a scheme generating an electromagnetic force using the coil and the magnet, and a scheme using a shape memory alloy.

The flexible printed circuit board is electrically connected to the substrate to transfer power applied through the substrate to the coil mounted in the housing.

The image photographing device having a function for compensating hand vibration further includes a yoke combined with the magnet mounted at the outside of the optical unit, wherein the yoke serves to concentrate a magnetic force generated from the magnet on the coil.

The image photographing device having a function for compensating hand vibration further includes a shield case combined at the outside of the housing, wherein the shield case serves to protect the optical unit inserted theretinto in addition to the housing and shield electromagnetic waves.

The suspension wire may include a vertical supporting part, a horizontal supporting part whose one end portion is combined with the optical unit by being bent at a right angle from the upper end portion of the vertical supporting part, and a bending part formed at any point of the vertical supporting part.

The bending part may be configured in a spring form and in a form bent to be protruded in one direction.

The suspension wire may be configured in a form in which the horizontal supporting part bent from the upper end portion of the vertical supporting part has a step, thereby absorbing the impact.

According to another exemplary embodiment of the present invention, there is provided an image photographing device having a function for compensating hand vibration, including: an optical unit; a magnet combined with an outer peripheral surface of the optical unit; a housing inserted with the optical unit and the magnet and having coils disposed at a position corresponding to the magnet; suspension wires arranged at four corners of the optical unit and having the upper end portions and the lower end portions each combined with a plate spring mounted on the optical unit and the bottom surface of the housing; a flexible printed circuit board surrounding the outer peripheral surface of the housing and applying current to the coils; and a substrate having the image sensor mounted on the top surface thereof and combined with the lower portion of the housing.

The plate spring combined with the upper end portion of the suspension wire may be configured in a rectangular shape and concave portions may be formed at both side portions of any point.

According to another exemplary embodiment of the present invention, there is provided an image photographing device having a function for compensating hand vibration, including: an optical unit; a magnet combined with an outer peripheral surface of the optical unit; a housing inserted with the optical unit and the magnet and having coils disposed at a position corresponding to the magnet; suspension wires arranged at four corners of the optical unit and having the upper end portions and the lower end portions each combined with the optical unit and the bottom surface of the housing to mount an elastic member at the outer peripheral surface; a flexible circuit board surrounding the outer peripheral surface of the housing and applying current to the coils; and a substrate having the image sensor mounted on the top surface thereof and combined with the lower portion of the housing.

The suspension wire may include a vertical supporting part and a horizontal supporting part by being bent at a right angle from the upper end portion of the vertical supporting part, wherein the horizontal supporting part is closely combined with the top surface of the optical unit to penetrate the upper end portion of the vertical supporting part through the optical unit. In this case, the vertical supporting part of the suspension wire may be mounted with the spring having the coil shape and the upper end portion of the vertical supporting part penetrating through the optical unit may also be mounted with the spring in a coil shape.

DESCRIPTION OF THE PREFERRED EMBODIMENTS

The acting effects and technical configuration with respect to the above objects of an image photographing device having a function for compensating hand vibration according to the present invention will be clearly understood by the following description in which exemplary embodiments of the present invention are described with reference to the accompanying drawings.

Figure 1:
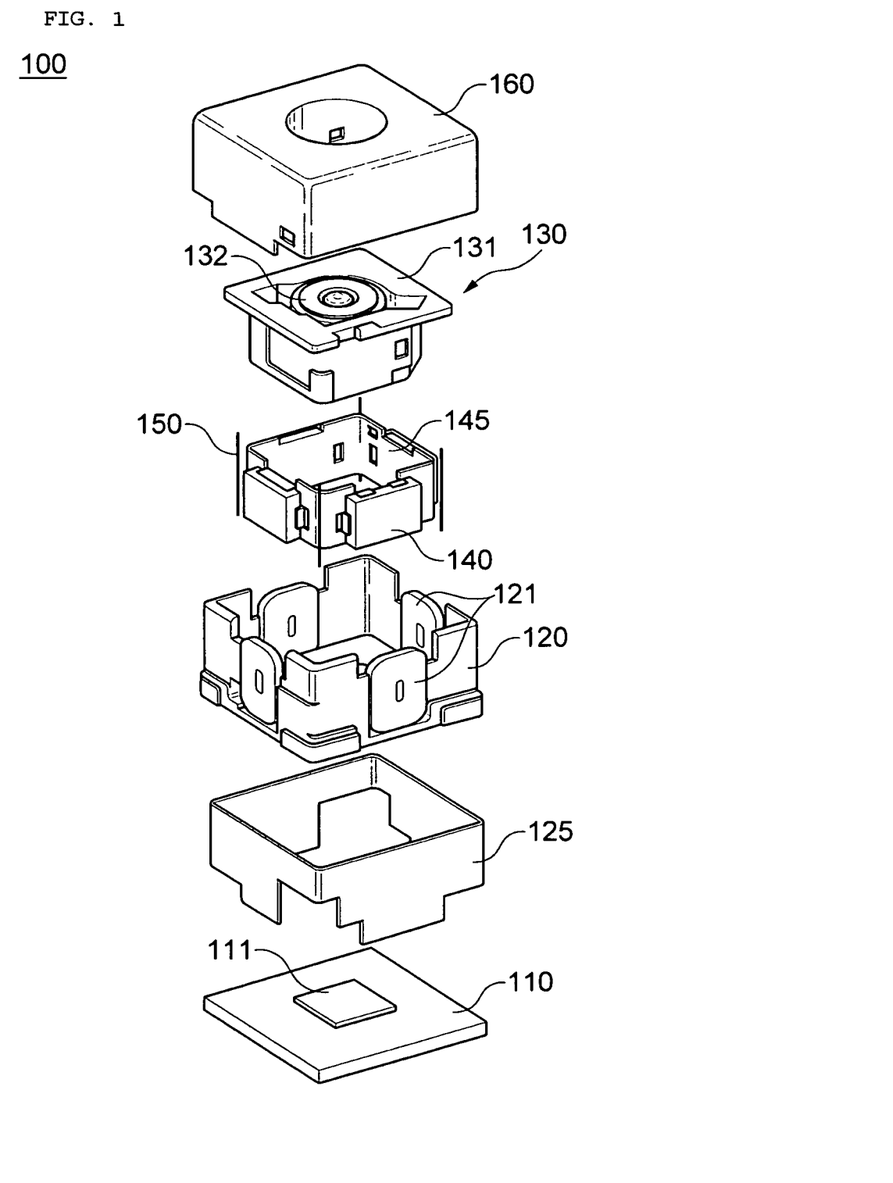
FIG. 1 is an exploded perspective view of an image photographing device having a function for compensating hand vibration according to the present invention.
Figure 2:
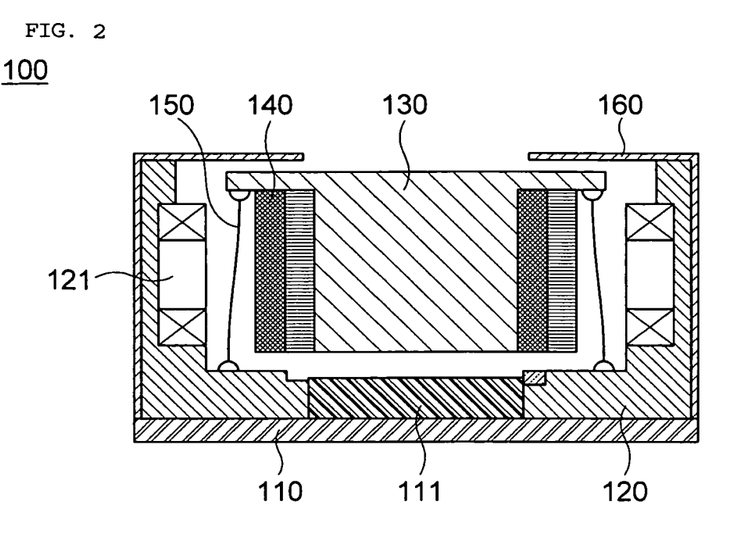
FIG. 2 is a cross-sectional view of an image photographing device having a function for compensating hand vibration of the present invention.

First, FIG. 1 is an exploded perspective view of an image photographing device having a function for compensating hand vibration according to the present invention and FIG. 2 is a cross-sectional view of an image photographing device having a function for compensating hand vibration of the present invention.

As shown, an image photographing device 100 having a function for compensating hand vibration according to the present invention may be configured to include a substrate 110 on which an image sensor 111 is mounted, a housing 120 mounted on the substrate 110, an optical unit 130 and a magnet 140 inserted into the housing 120, a suspension wire 150 supporting the optical unit 130 in the housing 120, and a shield case 160 covered on the top portion of the housing 120.

In this configuration, the outside of the housing 120 may be combined with a flexible printed circuit board 125 while surrounding the housing 120 and the flexible printed circuit board 125 may be electrically connected with the substrate 110 mounted on the bottom portion of the housing 120.

The upper central portion of the substrate 110 is mounted with the image sensor 111, which may be electrically connected to each other through a bonding member such as a wire bonding, an adhesive, or the like. The substrate 110 may be a printed circuit board or a ceramic substrate.

The housing 120 mounted on the substrate 110 is assembled in parallel with the top surface of the substrate 110 on which an image sensor 111 is mounted and is configured of a box type in which the top surface and the bottom surface are opened. Therefore, the optical unit 130 and the magnet 140 may be inserted into the housing 120 through the opened top surface and the image sensor 111 may be configured to be inserted thereinto through the opened bottom surface.

In addition, the housing 120 may be mounted with coils 121 wound on each of the four sides of the box type in one direction and the inner central portion thereof may be movably mounted with the optical unit 130 in a horizontal direction. In this case, the inside of the housing 120 may be inserted with the magnet 140, which is formed at the outside of the optical unit 130 at a predetermined interval, and the magnet 140 may be disposed at positions corresponding to the coils 121 mounted on the four sides of the housing 120.

The reason why the coil 121 and the magnet 140 are disposed at the position corresponding to each other is to implement the relative horizontal movement with respect to the driving displacement of the optical unit 130 mounted in the magnet 140 by using the electromagnetic force generated by an electric field generated by current applied to the coils and a magnetic field generated by the magnet 140.

In this case, the current applied to the coils 121 may be applied through the flexible printed circuit board 125 surrounding the outer peripheral surface of the housing 120.

Meanwhile, four corners of the optical unit 130 movably mounted in the housing 120 in a horizontal direction are supported by the suspension wire 150, such that the optical unit 130 may be mounted in the housing 120 in the floated state. The suspension wire 150 serves to elastically support the optical unit 130 in the housing 120 and to control the movement amount in an X and Y-axis direction of a relatively opposite side to the driving displacement when the driving displacement is generated in a direction orthogonal to the optical axis of the optical unit 130, i.e., in one direction or a plurality of directions to the optical unit 130, thereby making it possible to compensate the hand vibration.

In this case, when the lower end portion of the suspension wire 150 is combined with the bottom surface of the housing 120, it may be electrically connected to the substrate 110 mounted on the bottom portion of the housing 120 and the upper end portion thereof is combined with the optical unit 130 to apply the driving power to the optical unit 130.

As described above, the supporting structure and the supporting method of the optical unit 130 of the suspension wire 150 supporting the optical unit 130 in the housing 120 in the floated state in the air and horizontally moving it will be described below in more detail.

The optical unit 130 may be configured to include a bobbin 131, a lens barrel 132 mounted in the bobbin 131, and a driver (not shown) vertically driving the lens barrel 132. Power is applied to the driver through the suspension wire 150 to vertically drive the lens barrel 132 mounted in the bobbin 131, thereby making it possible to automatically control the focus by controlling the interval with the image sensor 111 mounted on the substrate 110.

Further, the driver installed in the optical unit 130 uses a voice coil motor scheme that vertically drives the lens barrel 132 by an electromagnetic force generated between a coil and a magnet, an ultrasonic motor scheme that uses a piezo, and a scheme that vertically drives the lens barrel by applying current to a shape memory alloy, or the like, thereby making it possible to drive the lens barrel 132 in an optical axis direction in the bobbin 131.

The magnet 140 is combined with a yoke 145 to be inserted into the housing 120. The yoke 145 is configured in a shape surrounding the outer peripheral surface of the optical unit 130 and the four sides thereof may be formed with protrusions capable of being easily attached with the magnet 140 to induce the generation direction of magnetic force generated from the magnet 140 to the coils 121 mounted in the housing 120, thereby making it possible to concentrate the magnetic force on the coil 121.

The shield case 160 is combined at the outside of the housing 120 into which the optical unit 130 and the magnet 140 are inserted to shield external electromagnetic waves while protecting components in the housing 120, such that the electromagnetic waves do not have an effect on the electromagnetic force generated between the coil 121 and the magnet 140.

As shown in FIG. 2, in the image photographing device having a function for compensating hand vibration according to the present invention, when the optical unit 130 is inserted into the housing 120 having the substrate 110 mounted at the bottom portion thereof, the optical unit 130 maintains a predetermined interval between the bottom surface and the inner wall of the housing 120 to be supported in the floated state in the housing 120.

The lower end portion of the optical unit 130 is supported at the bottom surface of the housing by a fixed suspension wire 150 and the upper end portion of the suspension wire 150 supports the bobbin 131 configuring the optical unit 130, thereby making it possible to be elastically moved in a horizontal direction within the housing 120 using the suspension wire 150.

In this configuration, the interval between the side portion of the optical unit 130 and the inner wall surface of the housing 120 may generally be formed in about 200 μm and the interval between the bottom surface of the optical unit 130 and the bottom surface of the housing 120 may be formed at an interval of 50 to 100 μm.

In the image photographing device of the present invention as described above, when the optical unit 130 supported to the suspension wire 150 shakes in the housing 120 by an external force applied from the outside of the image photographing device such as shutter driving or impact, etc., or the image photographing device is inclined to one side, the optical axis does not coincide with the light receiving surface of the image sensor due to a posture difference generated by the self-weight of the optical unit 130, thereby generating a blurring phenomenon deteriorating the image quality. To this end, the optical axis may coincide with the light receiving surface of the image sensor by driving the optical unit 130 in an opposite direction at all times, in which the driving displacement is generated, by the electromagnetic force generated by the coil 121 mounted in the housing 120 and the magnet 140 mounted in the optical unit 130. Therefore, even though the complex driving displacement is generated due to the shaking of the complex optical unit 130 in an X and Y-axis direction such as hand vibration, or the like, the optical unit 130 is moved in the relative direction of the driving displacement by the electromagnetic force between the coil 121 and the magnet 140. In this case, the driving of the optical unit 130 may be elastically controlled by the suspension wire 150.

Next, the suspension wired used for the image photographing device of the present invention configured as described above may be configured in various shapes in the supporting structure and the supporting scheme as described below. The structure of the suspension wire will be described in more detail with reference to the following drawings.

Structure of Suspension Wire

Figure 3:
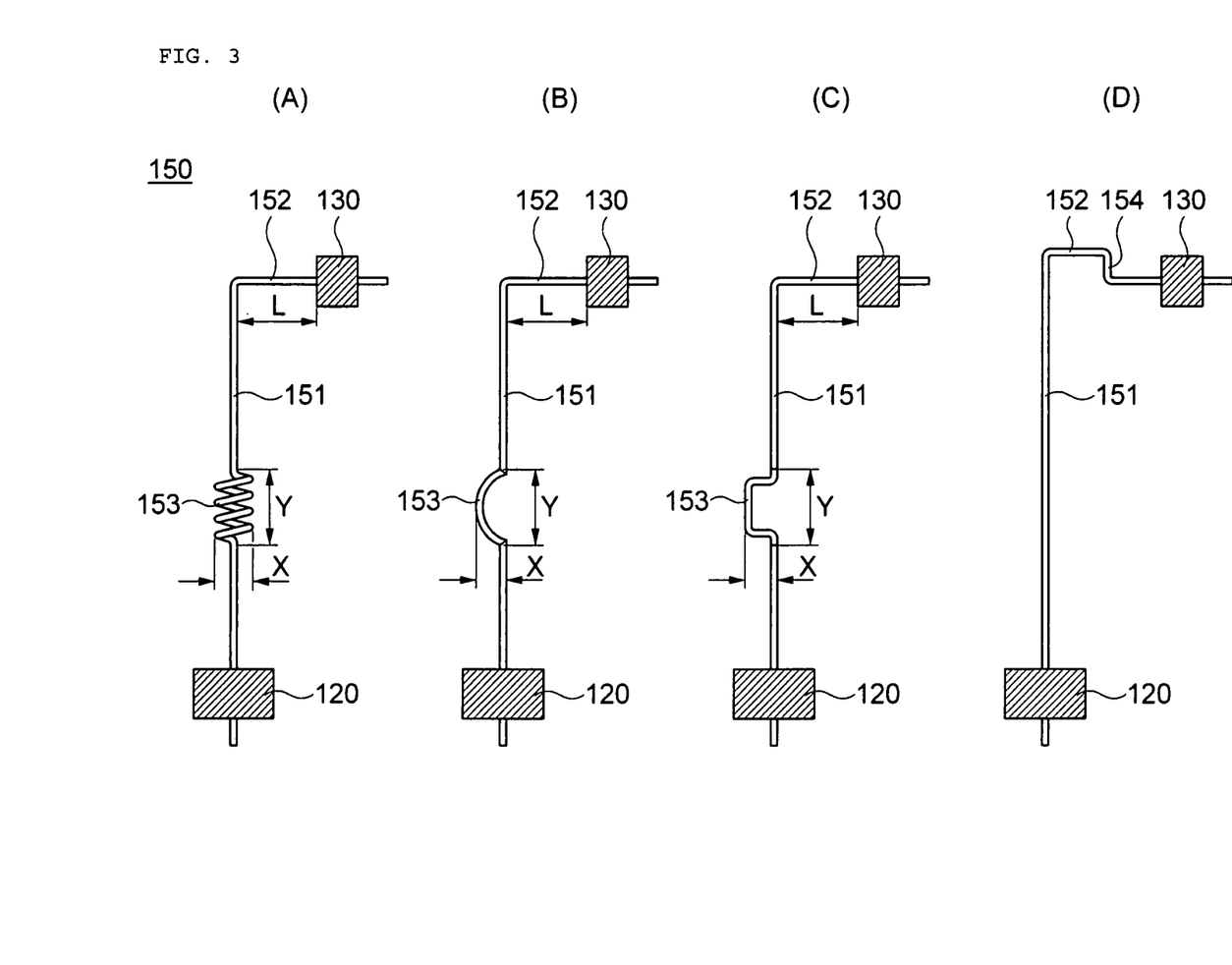
FIG. 3 is a cross-sectional view showing a structure of a suspension wire used in the image photographing device of the present invention.

FIG. 3 is a cross-sectional view showing a structure of a suspension wire used in the image photographing device of the present invention. As shown, the suspension wire 150 used for the image photographing device according to the exemplary embodiment may be configured to include a vertical supporting part 151, a horizontal supporting part 152 bent at a right angle from the upper end portion of the vertical supporting portion 151, and a bending part 153 formed at any point of the vertical supporting part 151.

The lower end portion of the vertical supporting part 151 is fixed to the housing 120 (FIG. 3 shows only a portion of the housing) and one end portion of the horizontal supporting part 152 bent from the upper end portion thereof is combined with the optical unit 130 (FIG. 3 shows only a portion of the optical unit), thereby making it possible to support the optical unit 130 in the floated state within the housing 120 as shown in FIG. 2.

The vertical supporting part 151 and the horizontal supporting part 152 of the suspension wire 150 may be formed at the same diameter or thickness. The bending part 153 formed on the vertical supporting part 151 is formed at a diameter or a thickness equal to or larger than the vertical supporting part 151, such that the a load applied to the suspension wire 150 is concentrated on the bending part 153, thereby making it possible to absorb most stress through the bending part 153 when impact is transferred to the suspension wire 150.

In this case, the bending part 153 formed at the vertical supporting part 151 of the suspension wire 150 may be configured in a spring shape as shown in FIG. 3A or may be configured in a bent shape to be protruded in one direction as shown in FIGS. 3B and 3C.

The suspension wire 150 in the form shown in FIGS. 3A to 3C primarily concentrates a stress through the bending part of the horizontal supporting part 152 and the vertical supporting part 151 when a stress is generated by an external impact and most of the compression stress is concentrated on the bending part 153 in a shape bent to be protruded in one direction, thereby making it possible to have more excellent breakdown stress values.

As shown in FIG. 3D, in the suspension wire 150 used in the exemplary embodiment, one end portion of the horizontal supporting part 152 combined with the optical unit 130 has a step, such that a stress generated when the impact applied to the optical unit 130 is transferred to the suspension wire 150 is dispersed to the step 154 of the horizontal supporting part 152 together with the vertical supporting part 151, thereby making it possible to prevent the deformations or rupture of the vertical supporting part 151.

In this case, the bent length L of the horizontal supporting part 152 and the length Y and the protruding width X of the bending part 153 formed on the upper end portion of the vertical supporting part 151 may be appropriately designed through previous simulation capable of calculating a breakdown stress against the standardized diameter or thickness of the suspension wire 150.

Example of Suspension Wire Supporting Scheme

Figure 4:
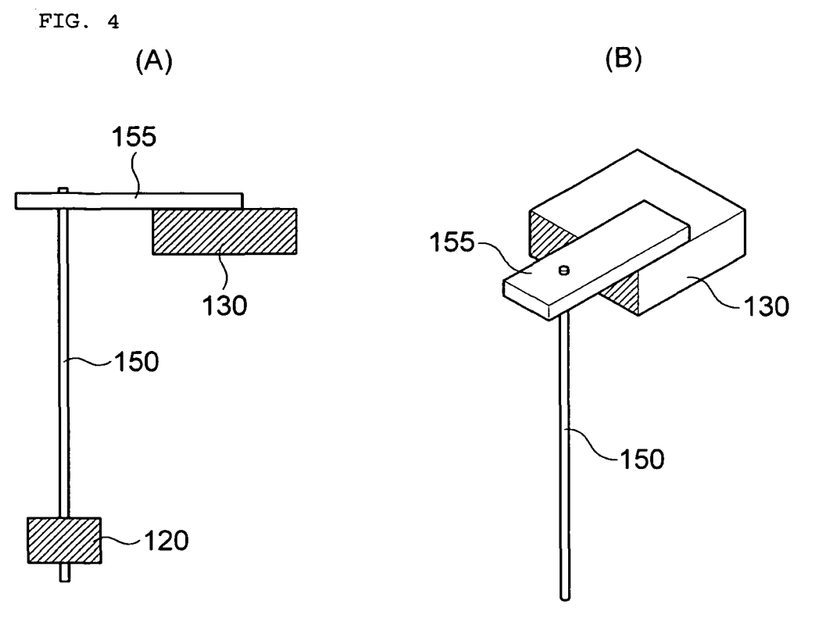
FIGS. 4 and 5 are cross-sectional views showing a method for supporting a suspension wire used for the image photographing device of the present invention.
Figure 5:
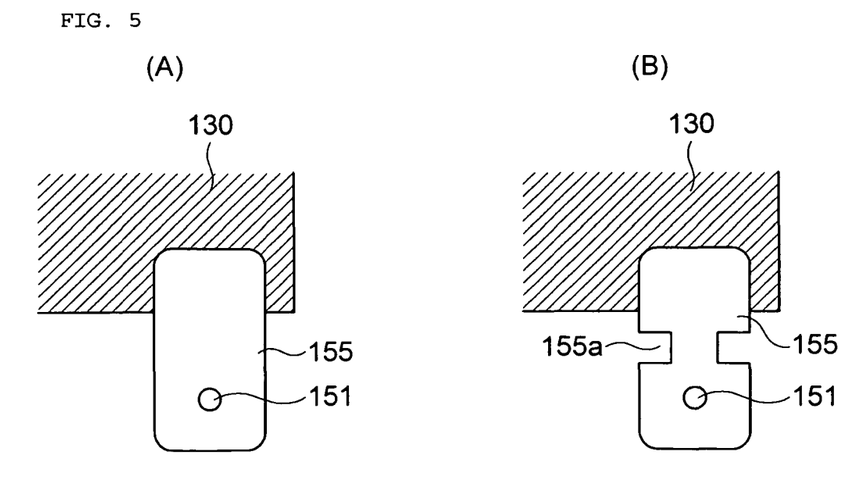

Next, FIGS. 4 and 5 are cross-sectional views showing a method for supporting a suspension wire used for the image photographing device of the present invention. As shown, in the suspension wire 150 used for the image photographing device according to the exemplary embodiment, the upper end portion of the optical unit 130 (FIGS. 4 and 5 show only a part of the optical unit) may be horizontally combined with a plate spring 155 and the lower end portion thereof may be fixed to the housing 120 (FIGS. 4 and 5 show only a part of the optical unit).

In this case, the plate spring 155 primarily absorbs the impact applied to the optical unit 130 to minimize the impact transferred to the suspension wire 150 combined to penetrate through one end portion thereof, such that the stress capable of being concentrated on the suspension wire 150 may be dispersed by the plate spring 155.

As shown FIG. 5A, the plate spring 155 may be mainly configured in a rectangular shape and may be configured in a rectangular shape in which concave portions 155a are formed at both side portions as shown in FIG. 5B to reduce the impact transferred to the suspension wire 150 by increasing elasticity and concentrating the stress on any point.

Meanwhile, the plate spring 155 may be configured a plate spring having various shapes in consideration of the impact conditions capable of being applied to the optical unit in addition to the shape shown in FIGS. 4 and 5. The plate spring 155 is elastically deformed by the external impact applied to the optical unit 130 such that only the residual vibration is transferred to the suspension wire 150, thereby making it possible to prevent the suspension wire 150 from being subjected to the bending deformation or ruptured due to the excessive stress concentration.

Another Example of Suspension Wire Supporting Scheme

Figure 6:
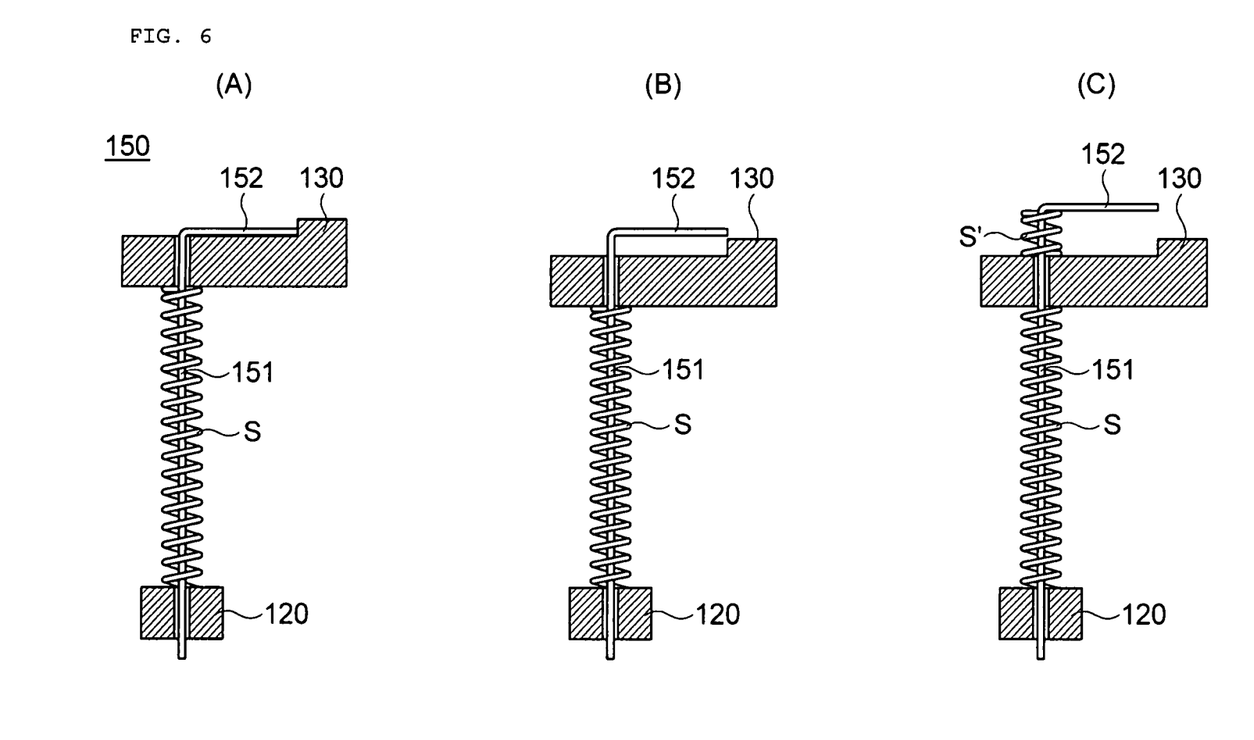
FIG. 6 is a cross-sectional view showing another method of supporting a suspension wire used in the image photographing device of the present invention.

Meanwhile, FIG. 6 is a cross-sectional view showing another method of supporting a suspension wire used in the image photographing device of the present invention. As shown in FIG. 6, the suspension wire 150 used for the image photographing device according to the exemplary embodiment may be configured of the vertical supporting part 151 and the horizontal supporting part 152 bent at a right angle from the upper end portion thereof. The outer peripheral surface of the vertical supporting part 151 may be combined with an elastic member, i.e., a spring S in a coil type.

In this case, the lower end portion of the vertical supporting part 151 may be fixed to the housing 120 (FIG. 6 shows only a portion of the housing) and the upper end portion thereof may be combined to penetrate through the optical unit 130 (FIG. 6 shows a portion of the optical unit), such that the horizontal supporting part 152 bent to one side from the upper end portion thereof may be closely combined with the top surface of the optical unit 130. In this case, the horizontal supporting part 152 may be closely attached to the top surface of the optical unit 130 by elastically attaching the upper end portion of the spring S combined with the outer peripheral surface of the vertical supporting part 151 to the bottom surface of the optical unit 130.

Therefore, as shown in FIG. 6A, when the external impact is applied to the optical unit 130 in the state where the optical unit 130 is combined with the housing 120, most of impact amount is transferred to the spring S to primarily absorb the impact applied to the optical unit 130 through the spring S, such that the spring S is compressed as shown in FIG. 6B. As a result, the impact amount transferred to the suspension wire 150 may be minimized, such that the deformation or rupture of the suspension wire 150 can be prevented basically.

As shown in FIG. 6C, the outer peripheral surface of the suspension wire 150 other than the portion combined to penetrate through the optical unit 130, that is, the outer peripheral surface of the suspension wire on the lower portion of the optical unit 130 and the outer peripheral surface of the suspension wire of the upper side of the optical unit 130 may be combined with the springs S and S', respectively.

The reason why the separate spring S' is mounted at the upper end of the suspension wire 150 penetrating through the optical unit 130 is to absorb the impact through the spring S' combined with the upper end portion of the suspension wire 150 when the impact is generated at the lower portion of the optical unit 130, together with absorbing the impact doubly when the impact is large in the tensile direction of the suspension wire 150.

As set forth above, the image photographing device having a function for compensating hand vibration according to the present invention can prevent the deformations or ruptures of the suspension wire by dispersing and absorbing the stress applied to the suspension wire through the curved portion, the plate spring, etc., when the impact applied to the optical unit is transferred to the suspension wire by forming the curved portion at any point of the suspension wire supporting the optical unit or combining the suspension wire with the optical unit by the plate spring.

Further, the present invention can expand the lifespan of the image photographing device by preventing the deformations or rupture of the suspension wire and can miniaturize the image photographing device without using the separate guide or the configuration of the ball bearing to float the optical unit other than the suspension wire in the housing.

Since the exemplary embodiments of the present invention have been described, those skilled in the art should appreciate that that various modifications and equivalent other embodiments may be made. Therefore, it is to be understood that the invention is not limited to the disclosed embodiments, but, on the contrary, is intended to cover various modifications and equivalent arrangements included within the spirit and scope of the appended claims.

What is claimed is:

1. An image photographing device having a function for compensating hand vibration, comprising:
   an optical unit;
   a magnet combined with an outer peripheral surface of the optical unit;
   a housing inserted with the optical unit and the magnet and having coils disposed at a position corresponding to the magnet;
   suspension wires arranged at four corners of the optical unit, having the upper end portions and the lower end portions each combined with the optical unit and the housing to support the optical unit in a state floated from the bottom surface of the housing, and having a predetermined bending part formed at any point, wherein the suspension wires includes a vertical supporting part whose lower end portion is fixed to the housing, a horizontal supporting part whose one end portion is combined with the optical unit by being bent at a right angle from the upper end portion of the vertical supporting part, and a bending part formed at any point of the vertical supporting part;
   a flexible printed circuit board surrounding the outer peripheral surface of the housing and applying current to the coils; and
   a substrate having an image sensor mounted on the top surface thereof and combined with the lower portion of the housing.

2. The image photographing device having a function for compensating hand vibration according to claim 1, wherein the optical unit includes a bobbin, a lens barrel mounted in the bobbin, and a driver vertically driving the lens barrel.

3. The image photographing device having a function for compensating hand vibration according to claim 2, wherein the driver performs an automatic focus by vertically driving the lens barrel by using an ultrasonic motor scheme using a piezo, a voice coil motor scheme generating an electromagnetic force using a coil and a magnet, or a scheme using a shape memory alloy.

4. The image photographing device having a function for compensating hand vibration according to claim 1, wherein the flexible printed circuit board is electrically connected to the substrate to transfer power applied through the substrate to the coil mounted in the housing.

5. The image photographing device having a function for compensating hand vibration according to claim 1, further comprising a yoke combined with the magnet mounted at the outside of the optical unit.

6. The image photographing device having a function for compensating hand vibration according to claim 1, further comprising a shield case combined at the outside of the housing.

7. The image photographing device having a function for compensating hand vibration according to claim 1, wherein the bending part is configured in a spring shape.

8. The image photographing device having a function for compensating hand vibration according to claim 1, wherein the bending part is configured in a shape bent to be protruded in one direction.

9. The image photographing device having a function for compensating hand vibration according to claim 1, wherein the suspension wires are configured in a form in which the horizontal supporting part bent from the upper end portion of the vertical supporting part has a step.

10. An image photographing device having a function for compensating hand vibration, comprising:
    an optical unit;
    a magnet combined with an outer peripheral surface of the optical unit;
    a housing inserted with the optical unit and the magnet and having coils disposed at a position corresponding to the magnet;
    suspension wires arranged at four corners of the optical unit and having the upper end portions and the lower end portions each combined with a plate spring mounted in the optical unit and the bottom surface of the housing to support the optical unit in a state floated from the bottom surface of the housing, wherein the plate spring is configured in a rectangular shape in which concave portions are formed at both side portions thereof;
    a flexible printed circuit board surrounding the outer peripheral surface of the housing and applying current to the coils; and
    a substrate having an image sensor mounted on the top surface thereof and combined with the lower portion of the housing.

11. The image photographing device having a function for compensating hand vibration according to claim 10, wherein the optical unit includes a bobbin, a lens barrel mounted in the bobbin, and a driver vertically driving the lens barrel.

12. The image photographing device having a function for compensating hand vibration according to claim 11, wherein the driver performs an automatic focus by vertically driving the lens barrel by using an ultrasonic motor scheme using a piezo, a voice coil motor scheme generating an electromagnetic force using a coil and a magnet, or a scheme using a shape memory alloy.

13. The image photographing device having a function for compensating hand vibration according to claim 10, wherein the flexible printed circuit board is electrically connected to the substrate to transfer power applied through the substrate to the coil mounted in the housing.

14. The image photographing device having a function for compensating hand vibration according to claim 10, further comprising a yoke combined with the magnet mounted at the outside of the optical unit.

15. The image photographing device having a function for compensating hand vibration according to claim 10, further comprising a shield case combined at the outside of the housing.

16. An image photographing device having a function for compensating hand vibration, comprising:
- an optical unit;
- a magnet combined with an outer peripheral surface of the optical unit;
- a housing inserted with the optical unit and the magnet and having coils disposed at a position corresponding to the magnet;
- suspension wires arranged at four corners of the optical unit and having the upper end portions and the lower end portions each combined with the optical unit and the bottom surface of the housing to mount an elastic member at the outer peripheral surface;
- a flexible printed circuit board surrounding the outer peripheral surface of the housing and applying current to the coils; and
- a substrate having an image sensor mounted thereon and combined with the lower portion of the housing.

17. The image photographing device having a function for compensating hand vibration according to claim 16, wherein the optical unit includes a bobbin, a lens barrel mounted in the bobbin, and a driver vertically driving the lens barrel.

18. The image photographing device having a function for compensating hand vibration according to claim 17, wherein the driver performs an automatic focus by vertically driving the lens barrel by using an ultrasonic motor scheme using a piezo, a voice coil motor (VCM) scheme generating an electromagnetic force using a coil and a magnet, or a scheme using a shape memory alloy.

19. The image photographing device having a function for compensating hand vibration according to claim 16, wherein the flexible printed circuit board is electrically connected to the substrate to transfer power applied through the substrate to the coil mounted in the housing.

20. The image photographing device having a function for compensating hand vibration according to claim 16, further comprising a yoke combined with the magnet mounted at the outside of the optical unit.

21. The image photographing device having a function for compensating hand vibration according to claim 16, further comprising a shield case combined at the outside of the housing.

22. The image photographing device having a function for compensating hand vibration according to claim 16, wherein the suspension wire includes a vertical supporting part whose lower end portion is fixed to the housing and the upper end portion is combined to penetrate through the optical unit, a horizontal supporting part closely combined with the top surface of the optical unit by being bent at a right angle from the upper end portion of the vertical supporting part, the outer peripheral surface of the vertical supporting part of the suspension wire being mounted with a spring in a coil shape.

23. The image photographing device having a function for compensating hand vibration according to claim 22, wherein the suspension wire is configured so that the spring is combined with the upper end portion of the vertical supporting part combined to penetrate through the optical unit.

* * * * *